(12) United States Patent  
Harada et al.

(10) Patent No.: US 8,790,420 B2  
(45) Date of Patent: Jul. 29, 2014

(54) METHOD FOR PRODUCING REDUCED METAL AND SLAG CONTAINING OXIDIZED NONFERROUS METAL USING AN UPGRADED COAL

(75) Inventors: Takao Harada, Kobe (JP); Hidetoshi Tanaka, Kobe (JP); Isao Kobayashi, Kobe (JP); Noriyuki Okuyama, Takasago (JP); Takuo Shigehisa, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 273 days.

(21) Appl. No.: 12/846,425

(22) Filed: Jul. 29, 2010

(65) Prior Publication Data

US 2010/0300247 A1    Dec. 2, 2010

Related U.S. Application Data

(62) Division of application No. 10/552,465, filed as application No. PCT/JP2004/002922 on Mar. 5, 2004, now Pat. No. 7,799,100.

(30) Foreign Application Priority Data

Apr. 9, 2003   (JP) .................................. 2003-105454

(51) Int. Cl.
*C10L 1/32*   (2006.01)
(52) U.S. Cl.
USPC .................................. 44/282; 44/607; 44/621
(58) Field of Classification Search
USPC .................... 75/10.22, 499; 44/282, 607, 621
See application file for complete search history.

(56) References Cited

U.S. PATENT DOCUMENTS

| 3,765,868 A | 10/1973 | Moklebust |
| 3,996,332 A | 12/1976 | Elger et al. |
| 4,030,982 A | 6/1977 | Gorin et al. |
| 4,033,728 A | 7/1977 | Aoki et al. |

(Continued)

FOREIGN PATENT DOCUMENTS

| EP | 0 583 126 A1 | 2/1994 |
| EP | 1 004 681 A1 | 5/2000 |

(Continued)

OTHER PUBLICATIONS

Extended European Searche report issued Sep. 23, 2010, in Application No. 10007592.8—2112.

(Continued)

*Primary Examiner* — Weiping Zhu
(74) *Attorney, Agent, or Firm* — Oblon, Spivak, McClelland, Maier & Neustadt, L.L.P.

(57) ABSTRACT

The present invention provides a method for producing a high-quality reduced metal using an upgraded coal as a carbonaceous material to be incorporated. In the method, coal is first aged by heating in an organic solvent to produce upgraded coal for metallurgy having higher thermal plasticity than that of the coal. Then, a mixture of the upgraded coal for metallurgy and a metal oxide-containing raw material is agglomerated by an agglomerator, and the resultant agglomerates are reduced by heating in a furnace and then melted by further heating to produce a reduced melt. The reduced melt is cooled and solidified in the furnace to produce a reduced solid. The reduced solid is discharged to the outside of the furnace and slag is removed using a screen to recover a metal as a reduced metal.

14 Claims, 8 Drawing Sheets

(56) References Cited

U.S. PATENT DOCUMENTS

| | | | |
|---|---|---|---|
| 4,248,669 A | 2/1981 | Theodore et al. | |
| 5,066,325 A * | 11/1991 | Lehto | 75/499 |
| 5,601,631 A | 2/1997 | Rinker et al. | |
| 6,036,744 A | 3/2000 | Negami et al. | |
| 6,306,195 B1 * | 10/2001 | Das et al. | 75/10.22 |
| 2001/0052272 A1 | 12/2001 | Schoukens et al. | |
| 2004/0154436 A1 | 8/2004 | Ito et al. | |

FOREIGN PATENT DOCUMENTS

| | | |
|---|---|---|
| EP | 1 213 362 A2 | 6/2002 |
| EP | 1 213 362 A3 | 6/2002 |
| JP | 56-20085 | 2/1981 |
| JP | 11-289188 | 10/1999 |
| JP | 11-349957 | 12/1999 |
| JP | 2000-8047 | 1/2000 |
| JP | 2000-096155 | 4/2000 |
| JP | 2003-55667 | 2/2003 |
| JP | 2003-073722 | 3/2003 |

OTHER PUBLICATIONS

Extended European Searche report issued Sep. 22, 2010, in Application No. 10007593.6—2112.

T. Yoshida, et al., "The Effect of Extraction Condition on 'Hypercoal' Production (1)-Under Room-Temperature Filtration", Fuel, XP 004354921, vol. 81, No. 11-12, Jul. 8, 2002, pp. 1463-1469.

* cited by examiner

METHOD FOR PRODUCING REDUCED METAL AND SLAG CONTAINING OXIDIZED NONFERROUS METAL USING AN UPGRADED COAL

CROSS REFERENCE TO RELATED APPLICATIONS

This application is a divisional application of prior U.S. patent application Ser. No. 10/552,465, filed Oct. 7, 2005, the disclosure of which is incorporated herein by reference in its entirety. The parent application is the National Stage of PCT/JP04/02922, filed Mar. 5, 2004, the disclosure of which is incorporated herein by reference in its entirety. The parent application claims priority to Japanese Patent Application No. 2003-105454, filed Apr. 9, 2003, the disclosure of which is incorporated herein by reference in its entirety.

BACKGROUND OF THE INVENTION

Technical Field

The present invention relates to the field of a technology for producing a reduced metal such as reduced iron and a slag containing an oxidized nonferrous metal using coal as a reducing agent. More specifically, the present invention relates to a method for upgrading low-rank coal such as high-volatile coal, and a method for producing a reduced metal and a slag containing an oxidized nonferrous metal using the upgraded coal.

A coal-based direct reduction process used as an alternative to a blast furnace process is a process (so-called carbon composite method) in which iron oxide agglomerates incorporated with a carbonaceous material are heated by radiation in a rotary hearth furnace to produce reduced iron, and this process has already successfully been brought into practical application on a commercial scale. However, this process has the problem that the strength of the agglomerates and heat transmission in the agglomerates are insufficient depending on the properties of the coal used as the reducing agent, thereby influencing the properties of a reduced iron product.

The inventors of the present invention improved the above-mentioned carbon composite method to develop a method in which iron oxide agglomerates incorporated with a carbonaceous material are heated by radiation in a rotary hearth furnace to produce reduced iron, and then the reduced iron is melted by further heating at a high temperature to separate between a metal and a slag and recover the metal. Also, practical application of this method on a commercial scale has been advanced. However, this process has the problem that the metal and the slag cannot be sufficiently separated depending on the properties of the coal used as the reducing agent, and thus the metal remains in the slag, thereby decreasing the recovery yield of the metal.

In the field of conventional nonferrous metallurgy, as a method for producing a titanium oxide-containing slag by separating an iron component from a material, for example, an ilmenite ore containing titanium oxide and iron oxide, a method is used, in which the ilmenite ore is supplied to an electric furnace together with a carbonaceous reducing agent so that iron oxide is reduced, melted, and then taken out as melted iron, and a titanium oxide-containing slag is recovered as an intermediate product for a titanium refining raw material. However, in this method, the temperature in the furnace is decreased by proceeding of reduction reaction of iron oxide, which is endothermic reaction, and thus much electric power is consumed for maintaining the temperature in the furnace. Also, the method has the problem that a large amount of melted FeO is produced in the treatment process, and thus the refractory in the furnace is greatly damaged by the melted FeO. Therefore, it is difficult to effectively produce a titanium oxide-containing slag using an electric furnace. There is further the problem that the inside of the furnace must be maintained in a highly reducing atmosphere for reducing iron oxide, and thus titanium oxide is also reduced by the highly reducing atmosphere.

Accordingly, the inventors of the present invention have advanced research and development for practical application of the above-described method disclosed by the inventors in consideration that as an alternative to the electric furnace method, the method can be basically applied to production of a slag containing an oxidized nonferrous metal, which is an intermediate product for nonferrous metallurgy. This method basically requires no electric power and does not damage the refractory because melted FeO is not produced. However, there still remains the problem that the ash in the coal used is mixed in the slag as in the above-described electric furnace method, thereby decreasing the product's value. There is further the problem that the metal and the slag are not sufficiently separated depending on the properties of the coal used as the reducing agent, and thus metallic iron is mixed in the slag to decrease the content of an oxidized nonferrous metal in the slag, thereby further decreasing the product's value.

On the other hand, an attempt has been made to upgrade low-rank coal such as high-volatile coal by solvent treatment to produce a carbonaceous material for metallurgy. When high-volatile coal without thermal plasticity is treated in a solvent at about 400° C., the coal is separated into an extract with the solvent and a residue. The extract is known to have thermal plasticity which is absent from the original coal. Also, it is indicated that high-strength coke usable for a blast furnace and a cupola can be produced using a mixture of the extract and the original coal or the like.

Since the conventional method for upgrading coal with a solvent is intended to be used in a vertical furnace such as a blast furnace or the like, a carbonaceous material is required to have load strength, and an operation of expressing a caking property other than thermal plasticity must be added. Furthermore, the conventional coal upgrading method uses, as the solvent, a hydrogen donor substance such as tetralin or the like for increasing the coal dissolving power, or a nitrogen-containing solvent such as N-methylpyrrolidinone or coal tar, and thus the method is disadvantageous to industrial production for the following reasons:

Since the hydrogen donor solvent loses its hydrogen donating property in extraction, the solvent must be re-hydrogenated for recycling the solvent. However, hydrogen is very expensive, and there has been found substantially no example of commercial application in the field of metallurgical use. The nitrogen-containing solvent has excessively high compatibility with coal, and thus the solvent and the extracted coal are bonded together, thereby failing to recover the solvent. This causes the problem of failing to recycle the solvent.

The present invention has been achieved in consideration of the above-described problems, and an object of the invention is to provide a method for upgrading low-rank coal such as high-volatile coal, which is unsuitable for the conventional carbon composite method, to produce upgraded coal for metallurgy which is suitable for the carbon composite method. Another object of the present invention is to provide a method for producing a high-quality reduced metal and a slag containing an oxidized nonferrous metal using the upgraded coal for metallurgy.

SUMMARY OF THE INVENTION

In an aspect of the present invention, a method for producing upgraded coal for metallurgy by extracting coal with an organic solvent comprises:

a slurry preparing step of mixing the coal and the organic solvent to prepare a raw material slurry;

an extraction step of aging the raw material slurry by heating to extract a soluble component of the coal with the organic solvent and prepare an extracted slurry; and a solvent removing step of removing the organic solvent by evaporation from the extracted slurry to produce upgraded coal for metallurgy as a solid form.

In the present invention, the solvent removing step preferably comprises:

a sedimentation step of sedimenting the insoluble component of the coal by allowing the extracted slurry to stand to separate between a supernatant containing an extracted coal, i.e., the extracted soluble component, and a residual coal slurry containing a residual coal, i.e., the sedimented insoluble component; and a first solvent removing step of removing the organic solvent by evaporation from the supernatant to produce the extracted coal as the upgraded coal for metallurgy.

Alternatively, the solvent removing step preferably comprises:

a sedimentation step of sedimenting the insoluble component of the coal by allowing the extracted slurry to stand to separate between a supernatant containing an extracted coal, i.e., the extracted soluble component, and a residual coal slurry containing a residual coal, i.e., the sedimented insoluble component;

a first solvent removing step of removing the organic solvent by evaporation from the supernatant to produce the extracted coal as a solid form; and a second solvent removing step of removing the organic solvent by evaporation from the residual coal slurry to produce the residual coal as a solid form.

The production method of the present invention preferably further comprises the following step:

a compounding step of compounding the extracted coal and the residual coal to produce the upgraded coal for metallurgy having controlled thermal plasticity.

The compounding ratio of the residual coal to the upgraded coal for metallurgy is preferably 0% by mass to 70% by mass. In the extraction step, the heating temperature is preferably 250° C. to 400° C., and the aging time is preferably 5 to 120 minutes. In the extraction step, aging is preferably performed in a nitrogen atmosphere at 0.5 MPa or more.

The organic solvent used in carrying out the method of the present invention preferably contains a two ring aromatic compound as a main component and has a boiling point of 200° C. to 300° C. at normal pressure. This method preferably further comprises a solvent recovering step of recovering the organic solvent removed by evaporation and recycling it to the slurry preparing step. The recovered organic solvent is substantially not rehydrogenated. As preferred means for recovering the organic solvent, vacuum distillation or spray drying can be used.

The present invention further includes, as a subject of protection, the upgraded coal for metallurgy produced by the above-described method.

In another aspect of the present invention, a method for producing a reduced metal using the upgraded coal for metallurgy produced by extracting coal with an organic solvent comprises:

a coal upgrading step of aging the coal by heating in the organic solvent to produce upgraded coal for metallurgy having higher thermal plasticity than that of the coal;

a mixing step of mixing the upgraded coal for metallurgy and a metal oxide raw material containing a metal oxide to prepare a mixture; and a reduction step of reducing the mixture by heating in a moving hearth furnace to produce a reduced metal as a reduced mixture.

The production method of the present invention preferably further comprises the following step:

1) a step of successively heating the reduced mixture in the moving hearth furnace to agglomerate the reduced metal in the reduced mixture;

2) a melting step of melting the reduced mixture by heating in a melting furnace to separate between a metal and a slag, and a recovering step of discharging the metal to the outside of the furnace and recovering the metal as the reduced metal;

3) a reduction and melting step of reducing the mixture by heating in the moving hearth furnace to produce the reduced mixture, and then melting the reduced mixture by further heating to produce the reduced metal as a reduced melt; or 4) a reduction and melting step of reducing the mixture by heating in the moving hearth furnace to produce the reduced mixture, and then melting the reduced mixture by further heating to produce the reduced metal as a reduced melt, a solidification step of solidifying the reduced melt by cooling in the moving hearth furnace to produce a reduced solid, and a separation and recovery step of discharging the reduced solid to the outside of the furnace to separate between a metal and a slag and recover the metal as the reduced metal.

In a further aspect of the present invention, a method for producing a slag containing an oxidized nonferrous metal using upgraded coal for metallurgy, which is produced by extracting coal with an organic solvent, comprises:

a coal upgrading step of aging the coal by heating in the organic solvent to produce the upgraded coal for metallurgy which has higher thermal plasticity than that of the coal;

a mixing step of mixing the upgraded coal for metallurgy and a metal oxide raw material containing iron oxide and an oxidized nonferrous metal to prepare a mixture;

a reduction and melting step of reducing the iron oxide in the mixture by heating the mixture in a moving hearth furnace to produce a reduced mixture containing metallic iron, and then melting the metallic iron by heating the reduced mixture to separate between the metallic iron and an oxidized nonferrous metal slag;

a solidification step of solidifying the mixture containing the oxidized nonferrous metal slag and the melted metallic iron by cooling in the moving hearth furnace to produce a reduced solid; and a separation and recovery step of discharging the reduced solid to the outside of the furnace to separate between a metal and a slag and recover the slag as the oxidized nonferrous metal slag.

The present invention further includes, as a subject of protection, the reduced metal and the oxidized nonferrous metal slag produced by the above-described methods.

INDEX OF NUMBERS OF THE DRAWINGS

1 . . . coal (original coal), 2 . . . organic solvent, 3 . . . slurry preparing tank, 4 . . . raw material slurry, 5 . . . slurry pump, 6 . . . heat exchanger, 7 . . . heater, 8 . . . aging tank, 9 . . . sedimentation tank, 12, 13 . . . solvent removing apparatus (solvent recovering apparatus), 14 . . . extracted coal, 16 . . . circulated solvent, 17 . . . residual coal, 24 . . . solvent pump, 25 . . . treated slurry, 26 . . . supernatant, 27 . . . residual coal slurry, 32 . . . upgraded coal for metallurgy (mixture), 101, 111 . . . metal oxide-containing raw material, 102, 112 . . . upgraded coal for metallurgy, 103, 113 . . . agglomerator, 104, 114 . . . agglomerate (raw material mixture or mixture), 105, 115, moving hearth furnace, 106 . . . reduced agglomerate (reduced mixture), 107 . . . melting furnace, 108, 118 . . . metal, 109, 119 . . . slag, 116 . . . reduced solid, 117 . . . screen, 211 . . . titanium-containing raw material, 212 . . . upgraded coal for metallurgy, 213 . . . agglomerator, 214 . . . agglomerate (mixture), 215 . . . moving hearth furnace, 216 . . . reduced solids, 217 . . . screen, 218 . . . metal, 219 . . . slag

DETAILED DESCRIPTION OF THE PREFERRED EMBODIMENTS

Embodiments of the present invention will be described in detail below with reference to the drawings.

First Embodiment

Figure 1:
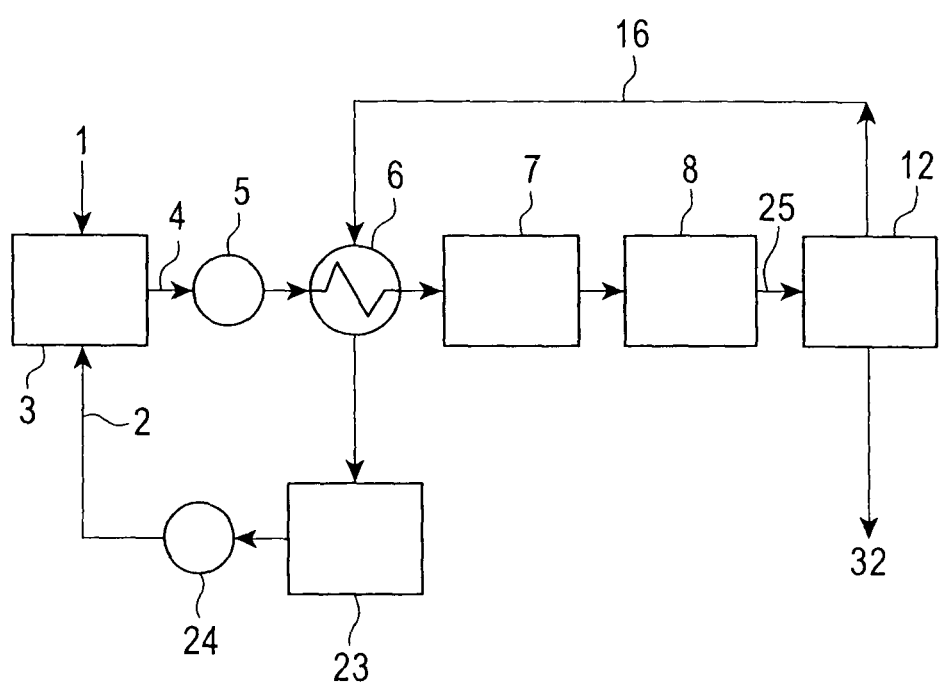
FIG. 1 is a process flow diagram illustrating a method for producing upgraded coal for metallurgy according to an embodiment of the present invention.

FIG. 1 shows an example of a process flow of a method for producing upgraded coal for metallurgy according to an embodiment of the present invention. As coal (original coal) 1 used as a raw material, low-rank coal having no or low thermal plasticity, such as bituminous coal, anthracite coal, sub-bituminous coal, or lignite, can be used.

[Slurry preparing step]: First, the coal 1 and an organic solvent (simply referred to as a "solvent" hereinafter) 2 are mixed in a slurry preparing tank 3 to prepare a raw material slurry 4.

[Extraction step]: The raw material slurry 4 is transferred to a heater 7 with a slurry pump 5 and heated therein. The heating temperature is 250° C. to 400° C. and preferably 350° C. to 420° C. In order to decrease a heat load on the heater 7, a heat exchanger 6 is preferably provided upstream the heater 7, for pre-heating the raw material slurry 4 using the latent heat of a circulated solvent 16 which will be described below.

The heated raw material slurry 4 is transferred to an aging tank 8 and aged by keeping at the above-described temperature range. The reason for setting the heating temperature (aging temperature) to 250° C. to 400° C. is the following: At a temperature lower than 250° C., the rate of extraction of the coal 1 in the solvent 2 is decreased. At a temperature over 400° C., the coal deteriorates due to thermal decomposition, and thus the rate of extraction of the coal 1 in the solvent 2 is decreased. Also, thermal decomposition of the coal (extracted coal), which has been extracted, proceeds to accelerate the production of hydrocarbon gases such as methane, ethane, and the like, thereby decreasing the yield of the extracted coal. The aging time of the raw material slurry 5 in the aging tank 8 is 5 to 120 minutes and preferably 30 to 80 minutes.

The pressure in the aging tank 8 is preferably as high as possible for preventing evaporation of the solvent, but a recommended pressure is about 50 to 500 kPa higher than the vapor pressure of the solvent at the aging temperature (heating temperature) because a high pressure brings about an increase in equipment cost. Specifically, the pressure is about 1 MPa (0.5 to 1.5 MPa) depending on the coal type and the solvent type. In the aging tank 8, the soluble component of the coal 1 in the raw material slurry 4 is dissolved as an extract (extracted coal) in the solvent 2, but the insoluble component remains solid as a residual coal, thereby maintaining a slurry state.

[Solvent removing step]: The treated slurry (referred to as the "extracted slurry" hereinafter) 25 is transferred to a solvent removing apparatus (solvent recovering apparatus) 12 in which the solvent is removed by evaporation to prepare a mixture 32 as a solid mixture containing the extracted coal and the residual coal. The extracted slurry 25 possesses temperature and pressure, and thus the solvent is evaporated due to the latent heat under reduced pressure. However, the mixture 32 of the extracted coal and the residual coal remains as a solid because it has no vapor pressure. Therefore, vacuum distillation, spray drying, or the like can be used for the solvent removing apparatus (solvent recovering apparatus) 12.

The above-described treatment with the solvent causes no thermal plasticity-expressing effect on the residual coal, but the treatment imparts thermal plasticity to the extracted coal due to the thermal plasticity-expressing effect while the original coal (coal) 1 has no thermal plasticity or lower thermal plasticity. Therefore, the mixture 32 of the extracted coal and the residual coal has higher thermal plasticity than that of the original coal 1 and can be used as upgraded coal for metallurgy (simply referred to as an "upgraded coal" hereinafter).

This embodiment is disadvantageous in that it has limitation to the type of the coal used for obtaining the upgraded coal 32 for metallurgy having a predetermined thermal plasticity. However, the embodiment is advantageous in that since not only the extracted coal but also the residual coal is fully recovered and used, a sedimentation tank 9 required in second and third embodiments, which will be described below, is not required, and only one solvent removing apparatus (solvent recovering apparatus) 1 may be used, thereby decreasing the cost of equipment.

[Solvent recovering step]: The solvent 16 removed by the solvent removing apparatus (solvent recovering apparatus) 12 is preferably recycled. In other words, the solvent (circulated solvent) 16 can be passed through the heat exchanger 6 to utilize the latent heat of the solvent for preheating the raw material slurry 4 and then recycled as the solvent 2 through a solvent tank 23 and a solvent pump 24.

The organic solvent 2 used preferably comprises, as a main component, a two ring aromatic compound similar to a coal structural unit and has a boiling point of about 200° C. to 300° C. because the pressure in the system can be kept at about 1 MPa suitable for extraction, and the solvent 2 can be easily recovered from a liquid after extraction. Specific examples of the organic solvent 2 include two ring aromatic compounds such as methylnaphthalene, dimethylnaphthalene, and naphthalene, a mixture mainly containing any of these two ring aromatic compounds, and carbonization oils and petroleums having boiling points in the above-described range. The circulated solvent 16 need not be hydrogenated for maintaining the dissolving power of the solvent 2 as long as the solvent 12 selected as descried above is used in treatment at the above-described temperature and pressure. Also, the solvent 16 is not bonded to the extracted coal to permit recovery (removal), and thus the solvent 16 can be repeatedly used without any problem. In addition, a small amount of oil is produced from the coal 1 due to heat treatment in the extraction step. The oil mainly comprises a two ring aromatic compound and thus has the effect of supplementing the circulated solvent 16 by the self-produced oil.

Second Embodiment

The thermal plasticity-expressing effect cannot be generally expected for the residual coal which is a solvent insoluble component. Therefore, when the mixture of the extracted coal and the residual coal after treatment with the solvent is used directly as upgraded coal for metallurgy as in the first embodiment, the upgraded coal may be not sufficiently suitable for producing a reduced metal by the carbon composite method because the thermal plasticity of the upgraded coal for metallurgy may become insufficient depending on the type of the original coal used. In this case, the extracted coal and the residual coal may be discharged separately, not as a mixture, and then proper amounts of the extracted coal and the residual coal may be mixed so as to have thermal plasticity suitable for producing the reduced metal by the carbon composite method.

Figure 2:
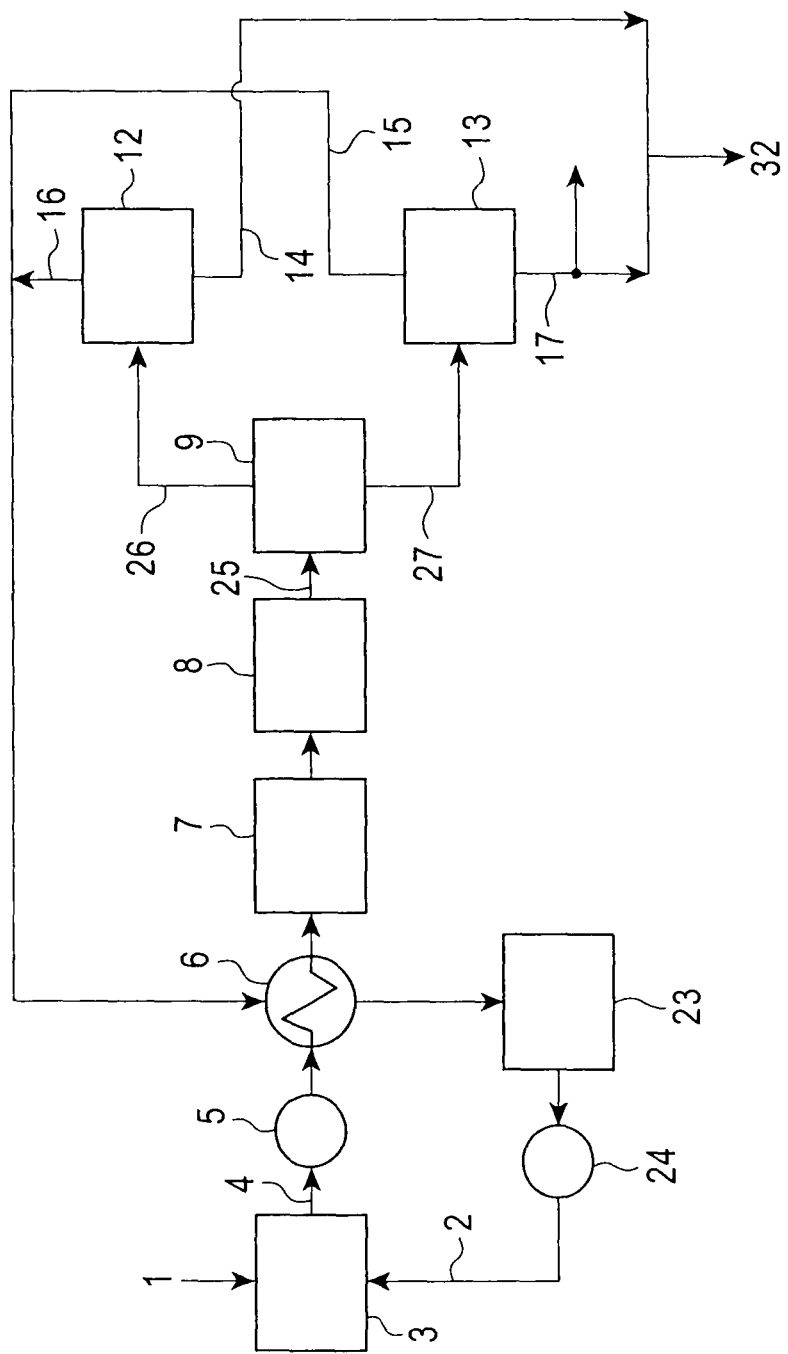
FIG. 2 is a process flow diagram illustrating a method for producing upgraded coal for metallurgy according to another embodiment of the present invention.

FIG. 2 shows an example of a process flow of a method for producing upgraded coal for metallurgy according to another embodiment of the present invention on the basis of the above-described technical idea. In this embodiment, description of portions common to the first embodiment is omitted, and only different portions will be described.

[Sedimentation step]: The extracted slurry 25 aged in the aging tank 8 is transferred to a sedimentation tank 9 and then allowed to stand for a predetermined time. As a result, the residual coal, which is a solid, gravitationally sediments at the bottom of the tank. The sedimentation time depends on the type of the coal 1, but the sedimentation time is preferably about 30 to 120 minutes. In the sedimentation, a residue sediments in an extract solution of the coal 1 in the solvent 2. The extract solution of the coal 1 in the solvent 2 can be easily continuously discharged as a supernatant 26. However, it is generally difficult to continuously discharge only the residual coal as the residue from the bottom of the tank. Therefore, the residual coal is discharged as a residual coal slurry 27 containing the solvent.

[First and second solvent removing steps]: The supernatant 26 and the residual coal slurry 27 are separately discharged, and the solvents thereof are removed by evaporation with separate solvent removing apparatuses (solvent recovering apparatuses) 12 and 13, respectively, to separately recover an extracted coal 14 and a residual coal 17. Like in the solvent recovering apparatus (solvent recovering apparatus) 12 in the first embodiment, vacuum distillation, spray drying, or the like can be used for the solvent removing apparatuses (solvent recovering apparatuses) 12 and 13.

[Compounding step]: The compounding ratio between the extracted coal 14 and the residual coal 17 separately recovered as described above is controlled to produce upgraded coal 32 for metallurgy having desired thermal plasticity while effectively utilizing the residual coal 17. The compounding ratio of the residual coal 17 to the upgraded coal 32 for metallurgy is over 0% by mass and 70% by mass or less, preferably 60% by mass or less.

[Solvent recovering step]: Like in the first embodiment, the solvents 15 and 16 removed by the solvent removing apparatuses (solvent recovering apparatuses) 12 and 13, respectively, are preferably recycled.

Third Embodiment

For example, when upgraded coal for metallurgy is used for producing a slag containing an oxidized nonferrous metal by the carbon composite method, mixing a slag product and coal ash decreases the product's value, and thus only an extracted coal not containing the ash is preferably used as the upgraded coal for metallurgy without being mixed with a residual coal containing the ash.

Figure 3:
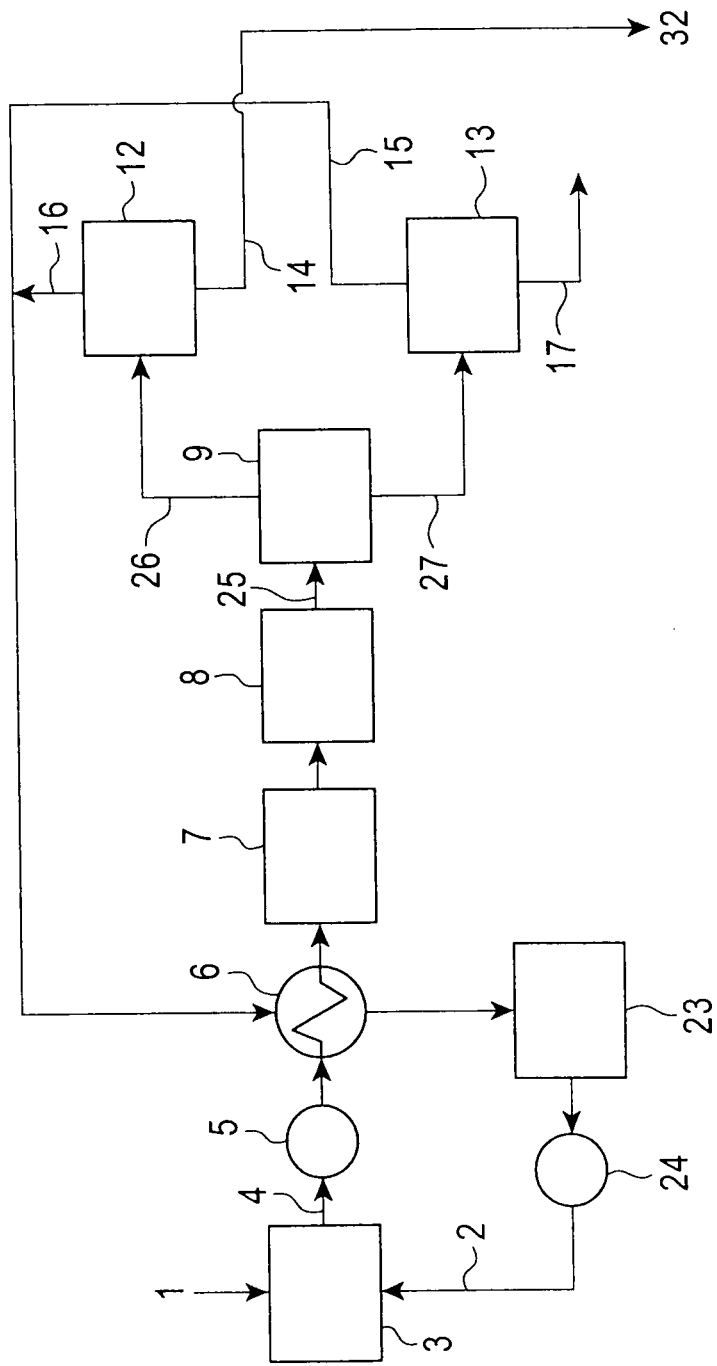
FIG. 3 is a process flow diagram according to a still another embodiment of the present invention.

FIG. 3 shows an example of a process flow of a method for producing upgraded coal for metallurgy according to still another embodiment of the present invention on the basis of the above-described technical idea. In this embodiment, the compounding step of the second embodiment is not required, and the other portions are common to the second embodiment. Namely, in this embodiment, only the extracted coal 14 obtained from the solvent removing apparatus (solvent recovering apparatus) 12 is used as the upgraded coal 14 for metallurgy as it is, and thus a method for separately utilizing the residual coal 17 must be considered. However, the upgraded coal 14 for metallurgy having high thermal plasticity and containing no ash can be obtained.

Fourth Embodiment

Figure 4:
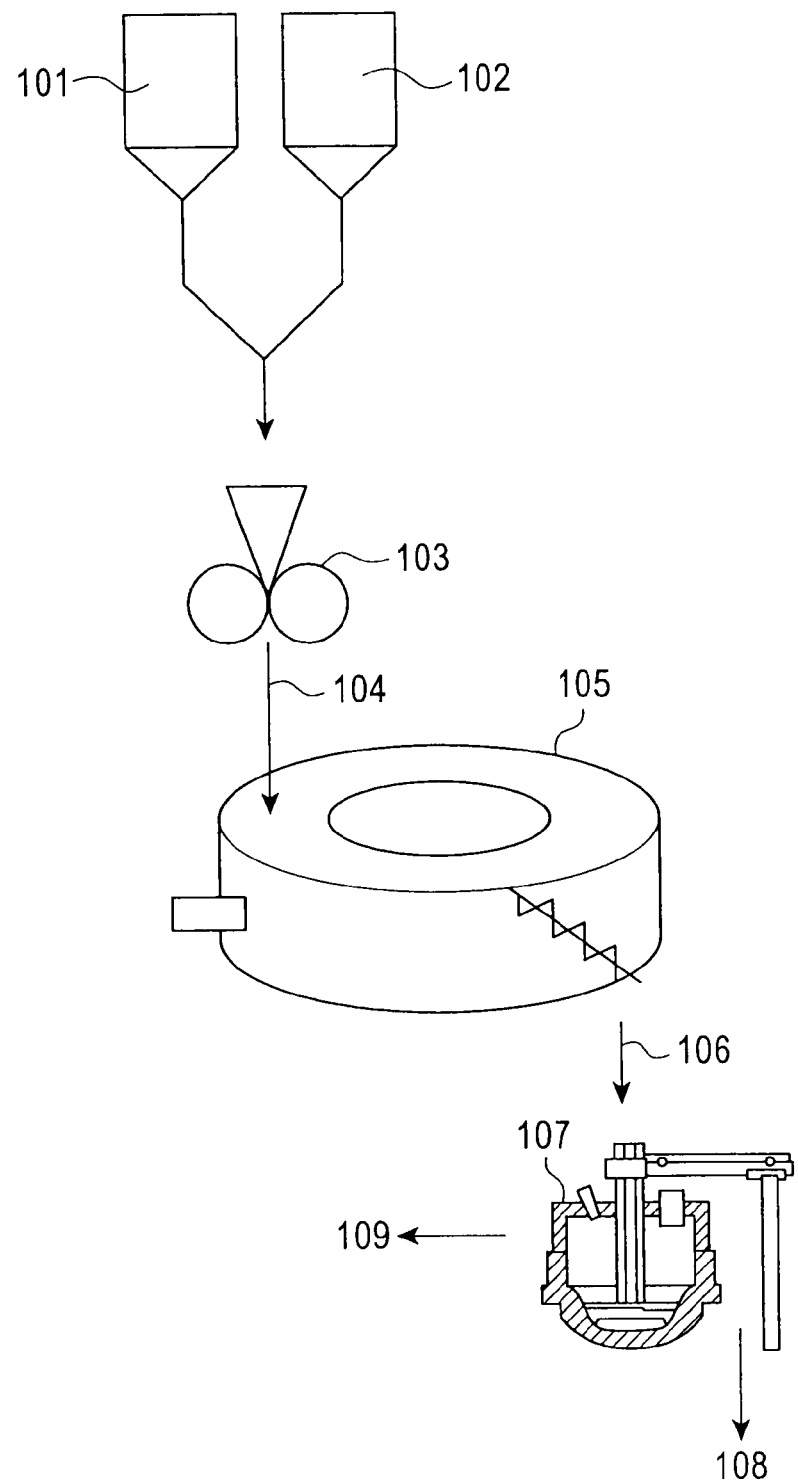
FIG. 4 is a flow diagram illustrating a step of reducing a chromium-containing raw material in a method for producing a reduced metal by a carbon composite method using upgraded coal for metallurgy according to a further embodiment of the present invention.

FIG. 4 shows a step of reducing a chromium-containing raw material used as a metal oxide raw material in a method for producing a reduced metal by the carbon composite method using upgraded coal for metallurgy according to a further embodiment of the present invention. In this embodiment, the metal oxide raw material is not limited to a raw material containing metal oxides of Fe and Cr, and a raw material containing metal oxide of Ni, Mn, and the like may be used. The form of the raw material may be any one of an ore, refining dust, and the like. Of course, the product may be reduced iron, melted iron, melted steel, or iron nuggets.

In FIG. 4, reference numeral 101 denotes a chromium-containing raw material (simply referred to as a "raw material" hereinafter) containing chromium oxide and iron oxide; reference numeral 102, upgraded coal for metallurgy; reference numeral 103, an agglomerator; reference numeral 104, agglomerates (mixture); reference numeral 105, a moving hearth furnace; reference numeral 106, reduced agglomerates (reduced mixture); reference numeral 107, a melting furnace; reference numeral 108, a metal; and reference numeral 109, a slag.

As the chromium-containing raw material 101, a chromium ore or a residue in a process for producing ferrochromium, such as dust, a slag, or the like, can be used. If required, an iron ore or mill scales can be added to adjust the components. When the raw material 101 contains a large amount of water, the raw material 101 is preferably previously dried. The degree of drying may be determined in view of the mixing means (the agglomerator 103 in this embodiment) used in the subsequent mixing step.

The grain sizes of the chromium-containing raw material 101 and the upgraded coal 102 for metallurgy are preferably as small as possible because the probability of contact is increased in reduction reaction, as described below. However, when the grain sizes are excessively small, granulation becomes difficult. Therefore, both the chromium-containing raw material 101 and the upgraded coal 102 for metallurgy preferably contain about 75% of grains of 200 mesh or less (75 μm or less). The chromium-containing raw material 101 and the upgraded coal 102 for metallurgy are preferably previously ground according to demand.

The compounding ratio of the upgraded coal 102 for metallurgy in the agglomerates (mixture) 104 may be determined by the amount of carbon required for reducing chromium oxide and iron oxide in the raw material 101 in the moving hearth furnace 105, the amount of carbon consumed by reduction of the residual chromium oxide in the reduced agglomerates (reduced mixture) 106 in the melting furnace 107, and the amount of carbon to be left in the metal 108. In consideration that reduction of chromium oxide is solid-phase reaction, it is important that the amount of the carbon compounded in the agglomerates (mixture) 104 exceeds the theoretically required amount of carbon, which will be described below, in order to increase the reduction rate of chromium. Even when the compounding amount of the carbon exceeds the theoretically required amount of carbon, the strength of the agglomerates 104 and the reduced agglomerates 106 is maintained due to the fact that the improved carbon 102 for metallurgy has thermal plasticity and functions as a binder during heating.

[Mixing step]: The raw material 101 and the upgraded coal 102 for metallurgy may be mixed using a mixer not shown in the drawing. The resultant mixture may be charged directly in the moving hearth furnace 105, but the mixture is preferably agglomerated in the agglomerator 103. This is because agglomeration decreases the amounts of the dust produced in the moving hearth furnace 105 and the melting furnace 107 and improves the efficiency of heat transmission in the agglomerates (mixture) 104 to increase the reduction rate. In particular, in the present invention, the upgraded coal 12 for metallurgy having high thermal plasticity is used as a carbonaceous material, and the carbonaceous material is fluidized during heating to increase the compactness of grains constituting the agglomerates 104, thereby achieving a high efficiency of heat transmission. The agglomerates (mixture) 104 may contain an auxiliary material such as a fluxing agent or the like. As the agglomerator 103, a compression molding machine such as a briquette press, a tumbling agglomerator such as a disk-type pelletizer, or an extrusion molding machine may be used. When the agglomerates (mixture) 104 after granulation have a high water content, the agglomerates 104 may be dried before being charged in the moving hearth furnace 105.

[Reduction step]: The agglomerates (mixture) 104 after granulation are charged in the moving hearth furnace 105 and heated by radiation. As the moving hearth furnace 105, a rotary hearth furnace, a linear furnace, a multistage furnace, or the like can be used. The radiation heating can be performed using a combustion burner or the like.

The agglomerates (mixture) 104 are rapidly heated by radiation heating, and consequently, in the agglomerates (mixture) 104, iron oxide and chromium oxide contained in the chromium-containing raw material 101 are mainly reduced by the fixed carbon contained in the carbonaceous reducing agent (upgraded coal for metallurgy) 102 according to the following reaction formulae (1) and (2) (refer to "Tekko Binran (Handbook of Iron and Steel)" edited by Iron and Steel Institute of Japan, third edition, vol. 2, Publishing Office: Iron and Steel Institute of Japan, issued on Oct. 15, 1976):

$$FeO+C \rightarrow Fe+CO-36.8 \text{ kcal} \qquad (1)$$

$$\Delta G^0 = 35350 - 35.9 \, T$$

$$7Cr_2O_3 + 27C \rightarrow 2Cr_7O_3 + 21CO - 1250.6 \text{ kcal} \qquad (2)$$

$$\Delta G^0 = 1230132 - 886.97 \, T$$

The reaction start temperature of formula (1) is 712° C., and the reaction start temperature of formula (2) is 1114° C. Fe produced by reaction of equation (1) is possibly partially dissolved in $Cr_7O_3$ produced according to equation (2) to produce $(Cr.Fe)_7O_3$.

The radiation heating is preferably carried out at a mean heating rate of 13.6° C./s or more during the time from the start of the radiation heating of the agglomerates (mixture) 104 to the time when the temperature of the agglomerates (mixture) 104 reaches 1114° C., which is the reduction reaction start temperature of chromium oxide. The term "the start of the radiation heating of the agglomerates (mixture) 104" means the time when the agglomerates (mixture) 104 enter a region (radiation heating region) heated by radiation with a combustion burner or the like in the moving hearth furnace 105, excluding the time from the supply of the agglomerates (mixture) 104 onto the furnace hearth to the entrance into the radiation heating region. The reason for excluding the time from the supply of the agglomerates (mixture) 104 onto the furnace hearth to the entrance into the radiation heating region is that during this time, the agglomerates (mixture) 104 are mainly heated only by conduction heating from the furnace hearth, and the temperature is not increased to the reduction reaction start temperature of FeO of 712° C. because the retention time (passage time) is generally short, thereby causing substantially no consumption of the fixed carbon of the incorporated carbonaceous material by reduction reaction.

The atmospheric temperature of the region (reduction step) of radiation heating of the agglomerates (mixture) 104 is preferably 1250° C. to 1400° C. This is because at a temperature lower than 1250° C., the heating rate of the agglomerates (mixture) 104 to 1114° C. tends to become insufficient, while at a temperature over 1400° C., the reduced agglomerates (reduced mixture) 104 soften and easily bond together or adhere to the furnace hearth.

For example, when the atmospheric temperature is 1300° C., the retention time of the agglomerates (mixture) 104 in the region (reduction step) of radiation heating is preferably 5.3 to 42.7 min.

Furthermore, in order to prevent re-oxidation of Fe and $Cr_7O_3$ produced by reaction, the atmospheric composition of the region of radiation heating (reduction step) of the agglomerates (mixture) 104 may be a reducing atmosphere formed by controlling the air ratio of the combustion burner or blowing a reducing gas into the moving hearth furnace 105.

The reduced agglomerates (reduced mixture) 106 reduced in the moving hearth furnace 105 are generally cooled to about 1000° C. by a radiation cooling plate provided in the moving hearth furnace 105 or a refrigerant spray device and then discharged by a discharge device.

The above-described theoretically required amount of carbon represents the amount of carbon theoretically required for producing $(Cr.Fe)_7O_3$ through the reaction of iron oxide and chromium oxide contained in the agglomerates (mixture) 104 according to formulae (1) and (2), and defined by the following formula:

Theoretically required amount of carbon=(Number of moles of $Cr_2O_3$)×27/7+(Number of moles of O bonded to Fe)+(Number of moles of Fe)×3/7

In the above-described reduction step, it is recommended that an atmosphere conditioning carbonaceous material is charged onto the hearth of the moving hearth furnace 105 together with the agglomerates (mixture) 104. The atmosphere conditioning material is particularly preferably charged as a bed before the agglomerates (mixture) 104 are charged onto the furnace hearth. However, even when the atmosphere conditioning material is charged simultaneously with or after charging of the agglomerates (mixture) 104, the predetermined effect can be obtained.

The effects of charging of the atmosphere conditioning carbonaceous material are as follows:

1) The reducing atmosphere is kept near the agglomerates (mixture) 104, for preventing re-oxidation of the reduced agglomerates (reduced mixture) 106.

2) The volatile components, CO gas, and the like produced from the atmosphere conditioning material can be used as a fuel for the moving hearth furnace 105, thereby decreasing the fuel consumption of the moving hearth furnace 105.

3) Buildup on the furnace hearth can be prevented to decrease a load on a discharge device and abrasion of a member such as a blade edge or the like.

4) The atmosphere conditioning material discharged after devolatilization together with the reduced agglomerates (reduced mixture) 106 can be utilized as a reducing agent and/or a heat source in the next melting step.

As the atmosphere conditioning carbonaceous material, coal, a waste plastic, a waste tire, or a biomass is preferred. For example, when coal or biomass is used, the material is charred in the moving hearth furnace 105, and the volatile component becomes a fuel for the moving hearth furnace 105. However, the char component can be used as a reducing agent and/or a heat source of the melting furnace. Alternatively, coke, charcoal, petroleum coke, char, or the like can be used. Such a material has a low volatile content, and thus the effect of decreasing the fuel consumption in the moving hearth furnace 105 is lower than that of coal.

The size (grain size) of the atmosphere conditioning material is not particularly limited, but a recommended average grain size is preferably 5 mm or less and more preferably 2 mm or less.

Furthermore, the thickness of the atmosphere conditioning material supplied onto the furnace hearth is preferably about 1 to 50 mm.

In addition to the atmosphere conditioning material, a hearth protecting material may be supplied for preventing build-up on the hearth. In this case, the atmosphere conditioning material is preferably charged on the hearth protecting material. As the hearth protecting material, a material containing a high-melting-point substance is preferred, and a material containing a carbonaceous substance is more preferred. As the high-melting-point substance, an oxide containing alumina and/or magnesia, or a substance containing silicon carbide is recommended.

[Agglomeration step]: The reduced agglomerates (reduced mixture) 106 reduced in the reduction step may be further heated in the moving hearth furnace to agglomerate the reduced metal (Fe and $Cr_7O_3$) contained in the reduced agglomerates (reduced mixture) 106. The heating temperature may be the same as or slightly higher than the temperature in the reduction step so that the reduced metal is not melted, and the heating time may be appropriately controlled according to the heating temperature. In this case, the reduced metal is agglomerated in the reduced agglomerates (reduced mixture) 106 to increase the grain size of the agglomerates. As a result, there are obtained the effect of upgrading separability between the metal and the slag, as compared with the reduced agglomerates (reduced mixture) 106 undergoing up to the reduction step without being subjected to the agglomeration step, the effect of decreasing the surface area of the agglomerates composed of the reduced metal and preventing re-oxidation, and the like.

[Melting step]: The reduced agglomerates (reduced mixture) 106 discharged from the moving hearth furnace 105 are preferably charged at a high temperature in a melting furnace 107 without being cooled. The melting furnace 107 may be connected directly to the discharge part of the moving hearth furnace 105 with a chute or the like, or a conveyance device such as conveyor or a container for storing the agglomerates 106 before charging into the melting furnace 107 may be used. When the melting furnace 107 is not adjacent to the moving hearth furnace 105 or the operation of the melting furnace 107 is stopped, the reduced agglomerates (reduced mixture) 106 may be cooled to room temperature and stored or transported as a half-finished product (ferrochromium refining raw material). Alternatively, the reduced agglomerates (reduced mixture) 106 may be hot-molded at a high temperature without being cooled, for decreasing the surface area, and the molded product may be cooled and stored or transported as a half-finished product having high resistance to re-oxidation, and then used. As the melting furnace 107, an electric furnace can be used, but a melting furnace using fossil energy such as coal, heavy oil, natural gas, or the like may also be used. If required, a fluxing material or the like is charged in the melting furnace 107, and the reduced agglomerates (reduced mixture) 106 are melted at a high temperature of 1400° C. to 1700° C. to separate between a metal 108 and a slag 109. The metal 108 is used directly as charge chromium or subjected to secondary refining to produce ferrochromium according to demand.

As described above, in the present invention, the compactness of the agglomerates 104 is increased by fluidization of the carbonaceous material during heating, and thus the compactness of the reduced agglomerates 106 is also increased to increase the apparent density. Therefore, the reduced agglomerates 106 can be easily immersed in a melted metal without floating on the melted metal, thereby increasing the melting speed and achieving high productivity.

Fifth Embodiment

Figure 5:
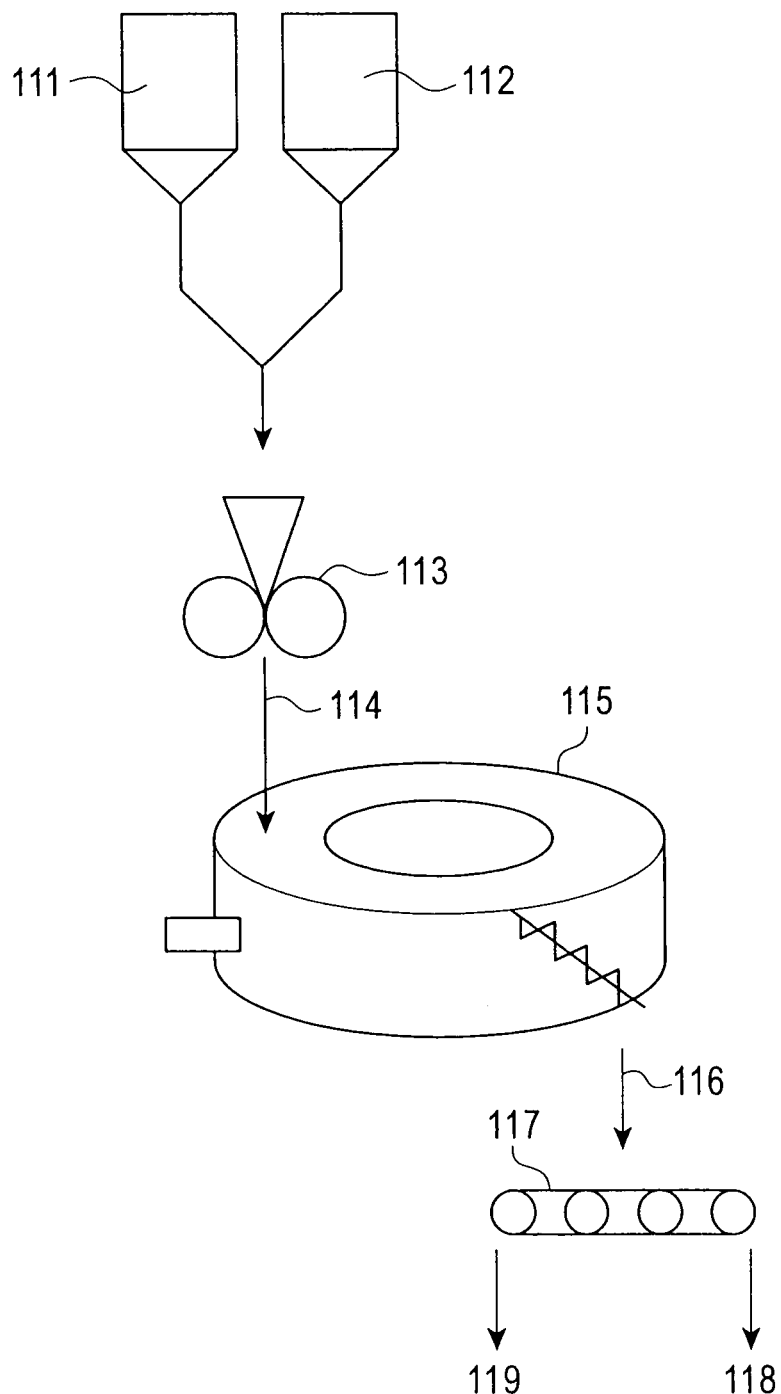
FIG. 5 is a flow diagram illustrating a step of reducing a chromium-containing raw material in a method for producing a reduced metal by a carbon composite method using upgraded coal for metallurgy according to a further embodiment of the present invention.

FIG. 5 shows a step of reducing a chromium-containing raw material which is a metal oxide-containing raw material in a method for producing a reduced metal by the carbon composite method using an improved carbon for metallurgy according to a further embodiment of the present invention. In FIG. 5, reference numeral 111 denotes a chromium-containing raw material (simply referred to as a "raw material" hereinafter) containing chromium oxide and iron oxide; reference numeral 112, a carbonaceous reducing agent; reference numeral 113, an agglomerator; reference numeral 114, agglomerates (mixture); reference numeral 115, a moving hearth furnace; reference numeral 116, a reduced solid; reference numeral 117, a screen; reference numeral 118, a metal; and reference numeral 119, a slag.

In the fifth embodiment, the raw material 111, the carbonaceous reducing agent 112, the agglomerator 113, and the agglomerates (mixture) 114 are the same as the raw material 101, the carbonaceous reducing agent 102, the agglomerator 103, and the agglomerates (mixture) 104, respectively, in the fourth embodiment. The mixing step is also the same as in the fourth embodiment, and thus description thereof is omitted.

[Reduction and melting step]: The agglomerates (mixture) 114 produced by granulation are charged in the moving hearth furnace 115 and heated by radiation at an atmospheric temperature of 1250° C. to 1400° C. Like in the fourth embodiment, the mean heating rate of the agglomerates (mixture) 114 by radiation heating may be 13.6° C./s or more from the start of radiation heating of the agglomerates (mixture) 114 to the time when the temperature of the agglomerates 114 (mixture) 114 reaches the reduction reaction start temperature of chromium oxide of 1114° C. In this region, the retention time of the agglomerates (mixture) 114 is preferably 5.3 to 42.7 min.

The reduced agglomerates (reduced mixture) are then melted by heating to produce a reduced melt in the moving hearth furnace 115 at an atmospheric temperature of 1350° C. to 1700° C., preferably 1350° C. to 1650° C., and more preferably 1350° C. to 1600° C., higher than the atmospheric temperature (1250° C. to 1400° C.) in the reduction region. The reason for setting the lower limit of the heat melting temperature to 1350° C. is that a temperature lower than this temperature easily causes difficulty in melting the reduced agglomerates (reduced mixture). The reason for setting the upper limit of the heat melting temperature to 1700° C. is that a temperature over this temperature easily causes the problem of heat resistance of the reduction furnace. In this temperature region, the retention time of the reduced agglomerates (reduced mixture) may be appropriately adjusted in a range of 0.5 to 10 min so that the reduced agglomerates (reduced mixture) are sufficiently melted to separate between a metal and a slag. The reason for setting the lower limit of the retention time of the reduced agglomerates (reduced mixture) to 0.5 min is that a retention time shorter than this easily causes insufficient separation between the metal and the slag. The reason for setting the upper limit of the retention time to 10 min is that a retention time over this brings about saturation of the degree of separation between the metal and the slag and rather increases the possibility of re-oxidation.

In the present invention, the upgraded coal for metallurgy having high thermal plasticity is used as a carbonaceous material, and thus the agglomeration property of the metal is increased to promote separation between the metal and the slag, as shown in examples which will be described below.

Instead of the above-described heating in the moving hearth furnace 115 in which the atmospheric temperature is changed in two steps, reduction and melting may be simultaneously performed by heating in one step at an atmospheric temperature of 1350° C. to 1700° C. from the start. In this case, the reduced melt can be obtained within a short time.

The metal and the slag are not necessarily both melted, and only one of the metal and the slag may be melted as long as both can be separated.

The same atmosphere conditioning material and hearth protecting material as in the fourth embodiment can be used.

[Solidification step]: The reduced melt is solidified by cooling to about 100° C. in the moving hearth furnace 115 to produce the reduced solid 116. As the cooling solidification means in the moving hearth furnace 115, the radiation cooling plate or refrigerant spray device described in the fourth embodiment can be used. The reduced solid 116 discharged from the moving hearth furnace 115 may be further cooled by cooling solidification means. As the cooling solidification means, means such as water granulation, indirect water cooling, refrigerant spray, or the like can be used.

[Separation step]: The reduced solid 116 is disintegrated as occasion demands, and then screened with the screen 117 to separate between the metal (coarse ferrochromium) 118 and the slag 119. If required, the metal can be further recovered from the separated slag 119 by means such as magnetic separation, flotation, or the like. If required, the separated metal (coarse ferrochromium) 118 is secondarily refined to produce a ferrochromium product. Alternatively, the metal (coarse ferrochromium) 118 may be used as a half-finished product (ferrochromium refining raw material), i.e., as a melting raw material for a melting furnace. When the metal 118 is used as the half-finished product, the melting energy for the slag in the melting furnace is not required because the slag has been removed from the metal 118 produced as the half-finished product by the method of the fifth embodiment, and thus the energy consumption of the melting furnace is significantly decreased in comparison with the method of the fourth embodiment in which the slag remains in the reduced agglomerates produced as a half-finished product. Also, the amount of the slag produced in the melting furnace is significantly decreased to significantly improve the production efficiency of the melting furnace. Furthermore, the metal (coarse ferrochromium) 118 can be used as a raw material for ferrochromium and can be used directly as a raw material for producing a chromium-containing alloy. Furthermore, the weight of the half-finished product is decreased due to removal of the slag, and thus the storage and transport coat can be decreased. Therefore, the present invention is preferably carried out in a production place of chromium ores. If required, the metal may be agglomerated for the sake of convenience of storage and transport.

In the present invention, the metal 118 and the slag 119 are sufficiently separated in the reduction and melting step, and thus the metal can be easily recovered in high yield by a mechanical separation operation in the separation step.

The atmosphere conditioning material may be recovered and reused or may be charged in the melting furnace together with the metal. The hearth protecting material is preferably recovered and reused.

Sixth Embodiment

Figure 6:
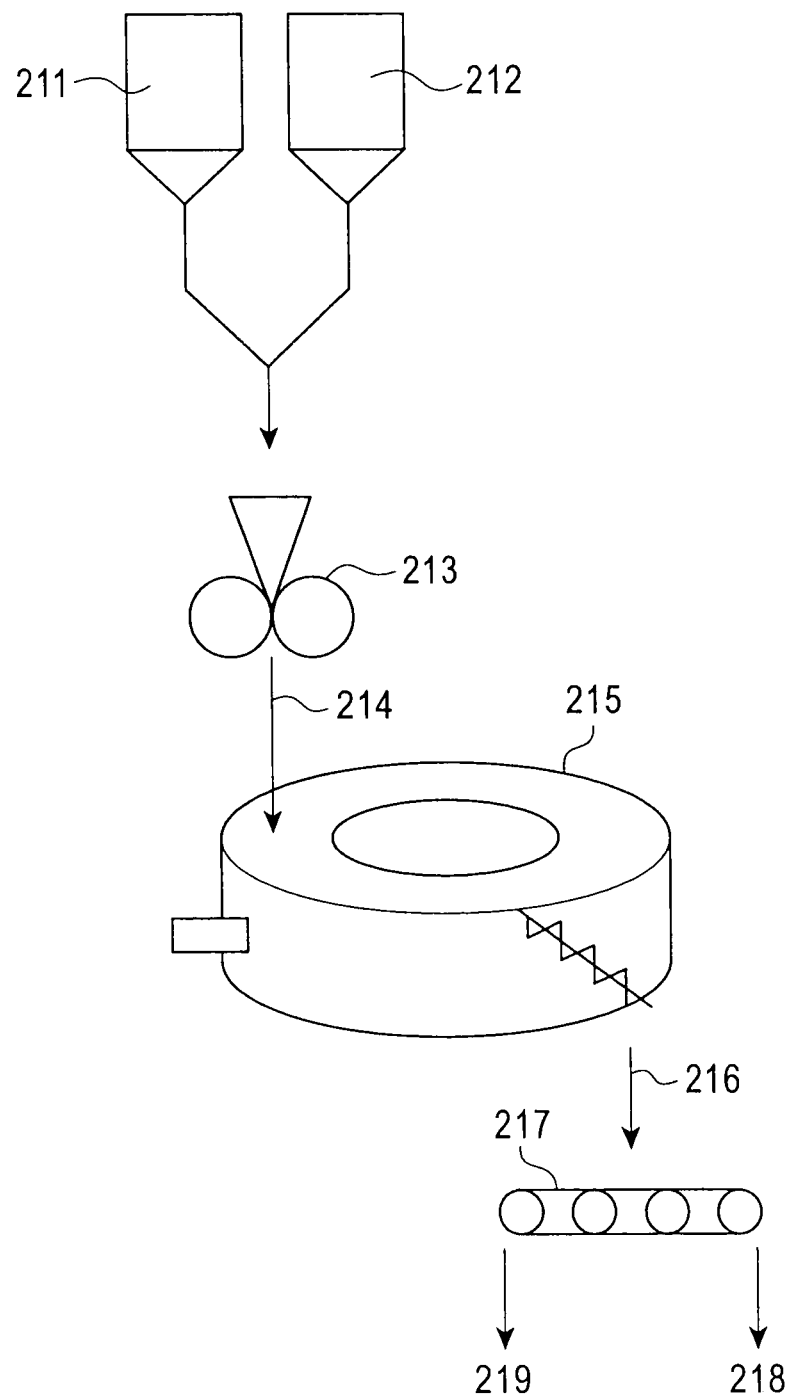
FIG. 6 is a flow diagram illustrating a step of reducing a titanium-containing raw material in a method for producing a slag containing an oxidized nonferrous metal by a carbon composite method using upgraded coal for metallurgy according to a further embodiment of the present invention.

FIG. 6 shows a step of reducing a titanium-containing raw material which is a metal oxide-containing raw material in a method for producing a slag containing an oxidized nonferrous metal by the carbon composite method using an improved carbon for metallurgy according to a further embodiment of the present invention. The metal oxide raw material is not limited to a raw material containing Fe and Ti oxides used in this embodiment, and a raw material containing metal oxides of V, Nb, and the like may be used. The form of the raw material may be any of an ore, refining dust, and the like. In FIG. 6, reference numeral 211 denotes a titanium-containing raw material (simply referred to as a "raw material" hereinafter); reference numeral 212, the upgraded coal for metallurgy; reference numeral 213, an agglomerator; reference numeral 214, agglomerates (mixture); reference numeral 215, a moving hearth furnace; reference numeral 216, a reduced solid; reference numeral 217, a screen; reference numeral 218, a metal; and reference numeral 219, a slag.

Examples of the titanium-containing raw material 211 include, but not limited to, natural ores such as titanic magnetite, ilmenite, titanic magnetite, and pseudobrookite; and by-products in production of titanium oxide or titanium, such as a residue in a centrifugal separator and a residue after filtration in a process for producing titanium oxide by a sulfuric acid method, and a residue after chlorination by a chlorine method. The raw material may be prepared according to demand. For example, an iron ore or iron-making dust may be added for controlling the amount of iron oxide, or rutile, anatase, or synthetic rutile may be added for controlling the amount of titanium oxide. Although the raw material mixture 214 containing ilmenite as the titanium-containing raw material 211 and the upgraded coal 212 for metallurgy will be described below as a representative example, the ilmenite 211 may be a natural ore, and the ratios of titanium and iron are not particularly limited.

The ilmenite 211 generally contains 40 to 60% by mass of titanium oxide and 30 to 50% by mass of iron oxide. In order to effectively produce a titanium slag, the content of iron oxide in the raw material mixture 214 is preferably 1/20 or more and more preferably 3/20 or more of the content of titanium oxide.

The natural ilmenite 211 contains a considerable amount of $SiO_2$ and the like as gangue components, but the contents of these gangue components in the raw material mixture 214 are preferably as low as possible because the gangue components such as $Al_2O_3$, CaO, MgO, and the like are mixed in the titanium slag to decrease the titanium purity.

As the upgraded coal 212 for metallurgy, the coal of any one of the first to third embodiments may be used, but the coal for metallurgy of the third embodiment comprising only the extracted coal is preferably used because the ash is not incorporated in a slag product. The compounding amount of the coal 212 for metallurgy in the raw material mixture 214 is not particularly limited, but the compounding amount is preferably controlled so that the amount of the upgraded coal 212 for metallurgy is sufficient for reduction of iron oxide. For example, the compounding amount is preferably determined so that the number of the moles of fixed carbon in the raw material mixture 214 is at least the number of the moles of oxygen bonded as iron oxide to iron. Since the rate of utilization of carbon depends on the raw material and carbon, the compounding amount is preferably appropriately controlled. The excess carbon for reduction reaction is carburized in reduced iron and can thus be used as carbon in pig iron. A carbonaceous reducing agent may be charged in the furnace together with the mixture 214, or previously placed on the hearth. In this case, the vicinity of iron oxide can be desirably maintained in a highly reducing atmosphere during reduction, thereby suppressing re-oxidation of iron oxide.

[Mixing step]: The raw material mixture (agglomerates) 214 may be prepared by kneading powders of the raw material 211 and the upgraded coal 212 for metallurgy using any mixing means (not shown in the drawing) such as a mixer or the like. The kneading method is not particularly limited. The resultant mixture 214 may be directly used in a power state, but the mixture 214 is preferably formed into agglomerates such as briquettes, pellets, plates, or the like by any molding method such as briquette pressing, tumbling granulation, or extrusion molding using the agglomerator 213, for upgrading the handling property. In this embodiment, briquette-shaped agglomerates 214 are described as a representative example.

In producing the agglomerates 214, the agglomerates 214 are preferably mixed with an appropriate amount of a calcium oxide source (for example, calcium hydroxide, calcium oxide, or the like), for controlling the composition of titanium slag components (titanium oxide, the gangue components in the ore used as the raw material, and the slag components contained as ashes in the carbonaceous material, such as $SiO_2$, $Al_2O_3$ and CaO) contained in the agglomerates 214. In this case, the melting point of the titanium slag produced in melting of the reduced iron is desirably decreased, and the thermal plasticity of the titanium slag is increased, thereby increasing separability between the titanium slag and the melted iron. For example, the agglomerates 214 containing calcium oxide may be produced by granulation or the agglomerates 214 may be covered with a calcium oxide source and then oxidized so that the calcium oxide source is present during melting.

In granulation to produce the agglomerates 214, bentonite, starch, calcium hydroxide, or a binder such as an organic binding agent may be used according to demand.

[Reduction and melting step]: The moving hearth furnace 215 used in the present invention is not limited as long as it includes a moving-type hearth. For example, any structure furnace such as a straight grate type or a rotary hearth furnace can be used.

The moving hearth furnace 215 is preferred because the temperature is easily controlled, and iron oxide can be selectively reduced with high efficiency within a short time at a lower temperature than that in a conventional electric furnace, i.e., a temperature lower than the reduction start temperature of titanium oxide. In particular, the rotary hearth furnace is preferred because the equipment has a relatively small unnecessary space, the atmosphere in the furnace can be easily controlled, and the reduction rate of iron oxide can be increased while suppressing reduction of titanium dioxide.

Description will be made of use of the rotary hearth furnace as the moving hearth furnace 215 as a representative example, but the method of the present invention does not have the view that the moving hearth furnace 215 is limited to the rotary hearth furnace.

Reduction is preferably performed in the furnace at a temperature kept in a range of 1200° C. to 1500° C. and more preferably 1200° C. to 1400° C. This is because within the range of 1200° C. to 1500° C., only iron oxide can be selectively reduced with high efficiency without reduction of titanium oxide.

At a heating temperature lower than 1200° C., reduction reaction of iron oxide slowly proceeds, and thus the retention time in the furnace must be increased to lower productivity. On the other hand, at a furnace temperature exceeding 1500° C., reduction reaction of titanium oxide proceeds to decrease the recovery rate of the titanium slag. Also, at a temperature over 1500° C., a low-melting-point slag containing FeO bleeds out during reduction, and the dissolution loss of the hearth refractory becomes significant, thereby causing difficulty in a continuous operation. Although bleeding may occur in the temperature range of 1400° C. to 1500° C. depending on the composition and compounding amount of the agglomerates, the frequency and possibility of bleeding are relatively low. Therefore, the temperature in the reduction period is preferably in a range of 1200° C. to 1500° C. and more preferably 1200° C. to 1400° C. In an actual operation, of course, the temperature in the furnace may be set to 1200° C. or less in the early stage of the reduction period and then increased to 1200° C. to 1500° C. for promoting reduction.

The reduction of iron oxide can be generally completed within about 5 to 20 minutes slightly depending on the ratio between iron oxide and titanium oxide which constitute the agglomerates 214 and the type of the carbonaceous material (upgraded coal for metallurgy).

The above-described reduction of the mixture (agglomerates) 214 produces a reduced mixture in which iron oxide is mostly reduced to metallic iron, but titanium oxide is hardly reduced.

Then, the temperature in the furnace is increased to 1300° C. to 1500° C., for reducing the remaining iron oxide and melting the produced reduced iron. By using this two-stage heating method, both the metallic iron and titanium oxide can be stably produced with high efficiency. Therefore, when the two-stage heating method is used, the rotary hearth furnace desirably has a structure in which the inside is divided into at least two sections using partitions in the moving direction of the furnace so that the section on the upstream side can be used as a reduction section, the section on the downstream side can be used as a heat-melting section, and the temperatures and atmospheric gas compositions of these sections can be separately controlled. The inside of the furnace may be divided into at least three sections using two or more partitions so that the temperatures and atmospheric gas compositions can be more strictly controlled. The number of the divided sections can be randomly changed according to the scale and structure of the moving hearth furnace.

In order to smoothly and efficiently promote the reduction and melting, the melting temperature in the furnace is preferably set to be about 100 to 300° C. and more preferably 120 to 250° C. higher than the reduction temperature.

The titanium slag is not necessarily melted. When the discharged product is recovered as a mixture of the iron nuggets 218 and the slag grains 219, the mixture discharged from the furnace is crushed and then screened by any desired means such as magnetic separation or the like to obtain the titanium-containing slag 219, as described in the separation and recovery step below. In the present invention, the upgraded coal 212 for metallurgy having high thermal plasticity is used as the carbonaceous material, and thus the agglomeration property of the melted iron can be increased, thereby facilitating separation between the iron nuggets 218 and the slag granules 219. Also, the metallic iron is little mixed in the slag grains to produce the titanium-containing slag 219 of high quality.

[Solidification step]: When a cooling portion provided with any cooling means is further provided in the furnace, the melted iron is cooled and solidified to produce the reduced solid 216, and thus the reduced solid 216 can be easily scraped out from the furnace using a discharge device provided on the downstream side.

[Separation and recovery step]: The reduced solid 216 is disintegrated as occasion demands, and then sieved with the screen 217. Furthermore, if required, the metal (iron nuggets) 218 and the slag (slag grains) 219 are separated by magnetic separation or the like (not shown) to obtain the titanium slag 219 of high quality.

EXAMPLES

The present invention will be described in detail below with reference to examples, but the present invention is not limited to these examples, and proper modifications can be made within a range suitable for the above- and below-described view of the invention. These modifications are also included in the technical field of the present invention.

Example 1

The two types of coal shown in Table 1 were treated with a bicyclic organic solvent, 1-methylnaphthalne, at each of the extraction temperatures (heating temperatures) and each of the extraction times (aging times) shown in Table 2. As a result, extracted coal and residual coal were obtained in the yields shown in Table 2.

TABLE 1

| Coal | | Composition (% by mass, dry base) | | | | | | Thermal |
|---|---|---|---|---|---|---|---|---|
| type | Class | Ash | Carbon | Oxygen | Nitrogen | Sulfur | Volatile | plasticity |
| Coal 1 | Sub-bituminous coal | 11.6 | 69.2 | 5.0 | 1.7 | 1.3 | 41.5 | No |
| Coal 2 | Bituminous coal | 10.3 | 78.9 | 4.9 | 2.1 | 0.6 | 28.8 | Yes |

TABLE 2

| | Extraction | | Yield (% by mass) | | | |
|---|---|---|---|---|---|---|
| Coal type | temperature (° C.) | Extraction time (min) | Extracted coal | Residual coal | Oil + water | Gas |
| Coal 1 | 400 | 40 | 41.8 | 54.5 | 2.3 | 1.4 |
| Coal 2 | 300 | 60 | 61.7 | 35.8 | 1.5 | 1.0 |

The extracted coal and the residual coal obtained by solvent treatment of coal 1 (sub-bituminous coal, high-volatile coal) shown in Table 1 were mixed at various compounding ratios to prepare upgraded coals. The Gieseler thermal plasticity test of the upgraded coals produced the results shown in Table 8. Table 8 indicates that by using the method of the present invention, coal initially showing no thermal plasticity can be upgraded to coal exhibiting thermal plasticity, and thermal plasticity can be changed by controlling the compounding ratio between the extracted coal and the residual coal.

TABLE 3

| Test No. | Compounding ratio of residual coal (% by mass) | Thermal plasticity start point (° C.) | Maximum thermal plasticity log(MFD) | Thermal plasticity |
|---|---|---|---|---|
| 1 | 0 (only extracted coal) | 275 | >4.8 | very high |
| 2 | 50 | 176 | >4.8 | very high |
| 3 | 58 | 215 | 1 | high |

Also, upgraded coal was obtained from coal 1 only by heat treatment (400° C.) in a solvent without separation between extracted coal and residual coal. This upgraded coal exhibited the thermal plasticity as shown in Table 4.

TABLE 4

| Test No. | Compounding ratio of residual coal (% by mass) | Thermal plasticity start point (° C.) | Maximum thermal plasticity log(MFD) | Thermal plasticity |
|---|---|---|---|---|
| 4 | No separation operation | 275 | 0.5 | some |

Table 4 indicates that coal without thermal plasticity can be upgraded to coal having thermal plasticity by heat treatment with a solvent without a separation operation. However, it is found that when the coal is separated into extracted coal and residual coat (Test No. 3 in Table 3), the thermal plasticity is more improved as compared with a case (Test No. 4 in Table 4) in which only heat treatment is performed under the same conditions. This is possibly due to the fact that even when the agglomeration of coal molecules is relieved by heating to extract a component having thermal plasticity, coexistence of the component of the residual coal causes re-agglomeration with the component molecules of the residual coal having no thermal plasticity due to cooling or polymerization of part of pyrolytic radicals with the residual coal to stabilize the radicals, thereby decreasing the thermal plasticity in comparison with the case in which the separation operation is performed. Therefore, in order to obtain higher thermal plasticity or control the ash content and thermal plasticity of the upgraded coal, it is desirable to use the method of separating between the extracted coal and the residual coal and then properly controlling the compounding ratio of the residual coal.

It was also confirmed that with coal 2 initially having thermal plasticity, the extracted coal exhibited higher thermal plasticity. However, the residual coals of both coals 1 and 2 did not exhibit thermal plasticity.

Example 2

Figure 7:
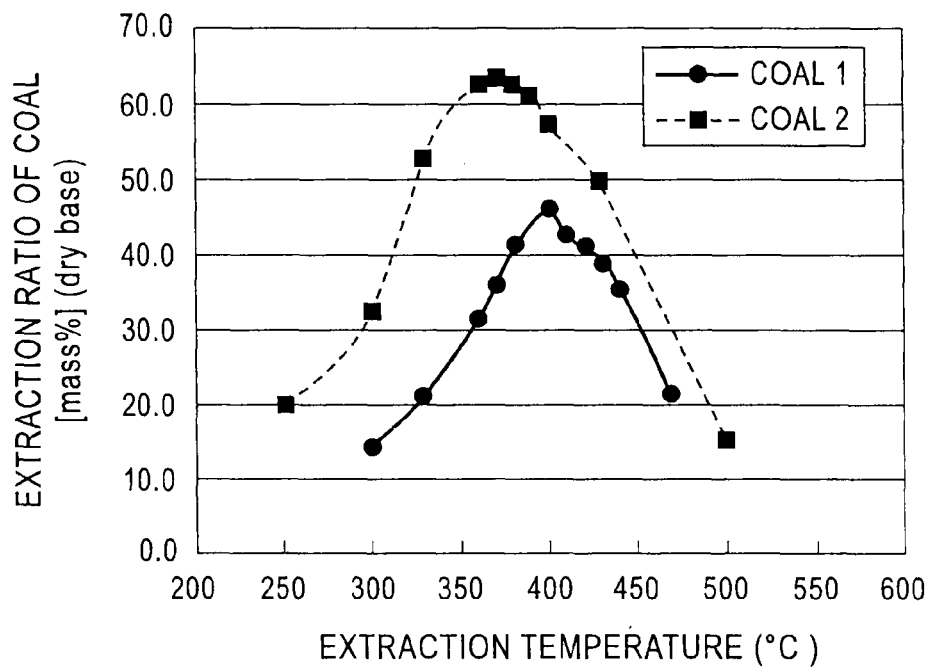
FIG. 7 is a graph showing the relation between the extraction temperature and the extraction rate of coal.

Each of coal 1 and coal 2 was treated with a bicyclic aromatic solvent, 1-methylnaphthalene, which was used in EXAMPLE 1, for a constant extraction time (aging time) of 40 minutes at changing extraction temperatures (heating temperatures). FIG. 7 shows the relation between the extraction temperature and the extraction rate of coal. As shown in FIG. 7, the coal dissolves out at about 200° C., and the extraction rate increases with the temperature. However, the extraction rate conversely decreases at a predetermined temperature or more. This is due to the fact that pyrolysis of the coal vigorously occurs, and the molecules become larger than the initial molecules due to polymerization reaction of pyrolytic molecules or the like. Therefore, heating is preferably performed under appropriate conditions at an optimum temperature for each coal type. The results of a test using many types of coal show that the heat treatment temperature is preferably about 350° C. to 420° C.

Example 3

Figure 8:
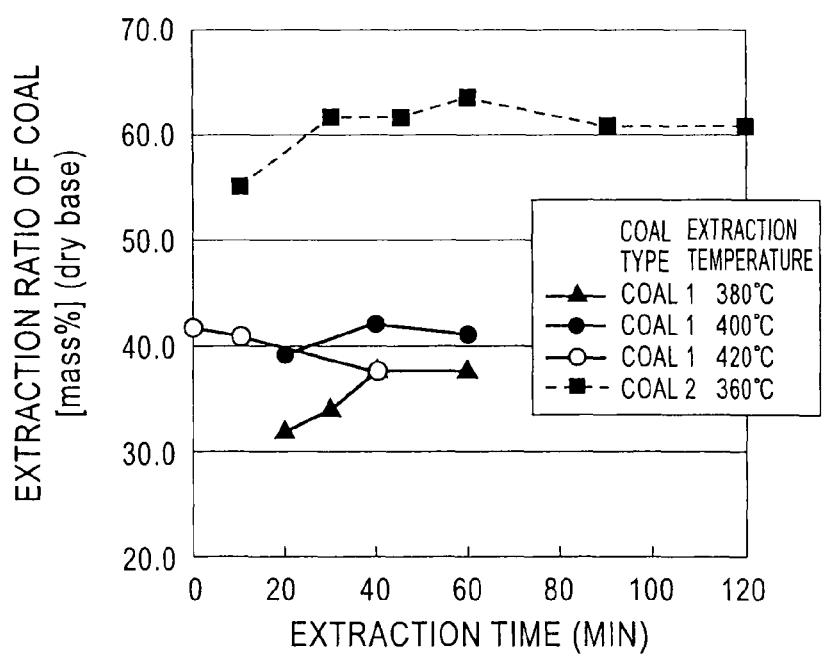
FIG. 8 is a graph showing the relation between the extraction time and the coal extraction rate.

Each of coal 1 and coal 2 was treated with a bicyclic aromatic solvent, 1-methylnaphthalene, which was used in EXAMPLE 1, at a constant extraction temperature (heating temperature) for changing extraction times (aging times). FIG. 8 shows the relation between the extraction time and the extraction rate of coal. As shown in FIG. 8, the extraction rate is substantially constant and shows a saturated state with an extraction time of about 40 to 120 minutes regardless of the extraction temperature. However, it is found that at an extraction temperature of as high as 420° C., the adequate extraction time is about 10 minutes.

Example 4

Figure 9:
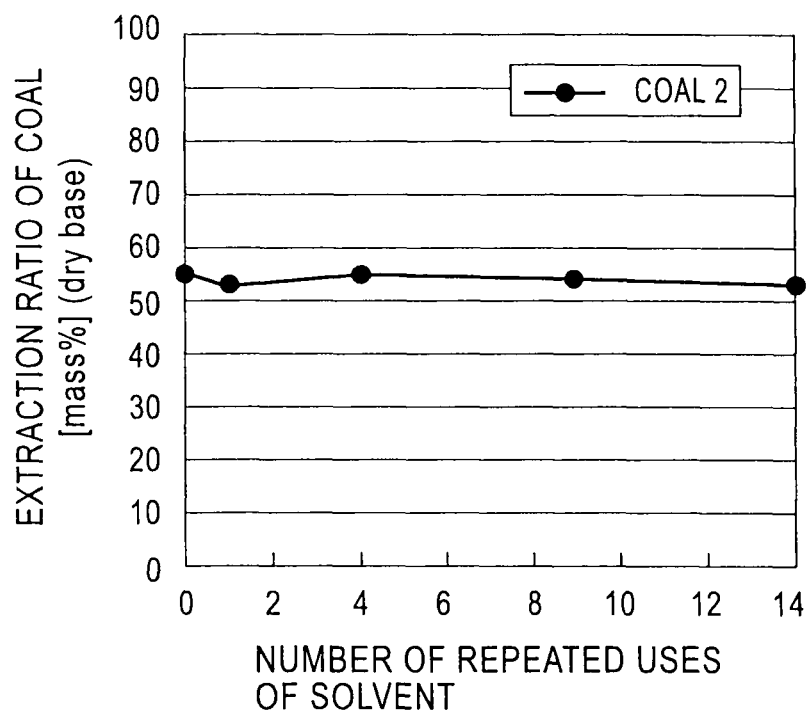
FIG. 9 is a graph showing the relation between the number of repeated uses of a solvent and the coal extraction rate.

Coal 1 was repeatedly extracted using, as an initial solvent, a bicyclic aromatic solvent, 1-methylnaphthalene, which was used in EXAMPLE 1, and the solvent was repeatedly recovered. FIG. 9 shows the relation between the number of repeated uses and the extraction rate of coal. FIG. 9 indicates that even when the solvent is repeatedly used, the extraction rate is substantially constant, and thus the bicyclic aromatic solvent can be stably recycled.

Example 5

A reduction test simulating production of a reduced metal (reduced iron) by the carbon composite method was carried out. An iron ore was used as a metal oxide, and the following three types of carbonaceous materials were used: (1) high-volatile coal (coal 1) not treated with a solvent, (2) upgraded coal (Test No. 4 in EXAMPLE 1) obtained only by solvent treatment of the high-volatile coal (coal 1) without separation between extracted coal and residual coal, (3) upgraded coal (Test No. 3 in EXAMPLE 1) obtained by solvent treatment of the high-volatile coal (coal 1), separating between extracted coal and residual coal, and then again mixing the extracted coal and the residual coal at the same ratio as that in the separation operation. Tables 8 to 10 show the compositions and grain sizes of the iron ore and carbonaceous materials used in this example. The iron ore was mixed with each carbonaceous material to prepare a mixed raw material, and 5 g of the mixed raw material was charged in a cylinder of 20 mm in diameter. Then, a load of 20 ton was applied to form a tablet, and the formed tablet was reduced at 1300° C. in a nitrogen atmosphere in a small heating furnace. The compounding ratio of the carbonaceous material in the mixed raw material was adjusted so that the amount of the residual carbon in reduced iron was 6% by mass.

Table 5 shows the crushing strength of the reduced iron obtained by the reduction test. As shown in Table 5, when coal 1 (high-volatile coal) without thermal plasticity is used, the strength of the reduced iron becomes very low (Test No. 1-1), while when coal 1 (high-volatile coal) initially having no thermal plasticity is upgraded by solvent treatment, a soft melting property is exhibited. It is also found that by using such upgraded coal as a carbonaceous material to be incorporated, the strength of reduced iron is significantly improved (Test Nos. 1-2 and 1-3). The yield of the upgraded coal from original coal 1 (high-volatile coal) was 96%, and the degrees of metallization of reduced iron in all tests were about 90%.

TABLE 5

| Test No. | Type of carbonaceous material | Gieseler maximum thermal plasticity of carbonaceous material log(MFD) | Crushing strength of reduced iron (N/piece of DRI) | Evaluation | Remarks |
|---|---|---|---|---|---|
| 1-1 | High-volatile coal (unupgraded coal) | 0 | 25 | Bad | Comparative example |
| 1-2 | Upgraded coal (no separation operation) | 0.5 | 118 | Good | Example of this invention |

TABLE 5-continued

| Test No. | Type of carbonaceous material | Gieseler maximum thermal plasticity of carbonaceous material log(MFD) | Crushing strength of reduced iron (N/piece of DRI) | Evaluation | Remarks |
|---|---|---|---|---|---|
| 1-3 | Upgraded coal (prepared by re-mixing after separation operation) | 1 | 157 | Excellent | Example of this invention |

Example 6

Unlike in EXAMPLE 5, a reduction test was carried out under conditions in which the reduction temperature was increased to 1450° C. to melt and separate between a metal and a slag. The compounding ratio of a carbonaceous material in a mixed raw material was adjusted so that the amount of the residual carbon in the metal (iron nuggets) was 4.5% by mass.

A metal produced by the reduction test was cooled to obtain a solid, and the resultant solid was disintegrated then separated into iron nuggets (metal) and a slag by magnetic separation. Table 6 shows the ratio of the iron nuggets with a grain size of 0.5 mm or more in the iron nuggets recovered after separation. As shown in Table 6, when coal 1 (high-volatile coal) without thermal plasticity is used, the obtained iron nuggets mainly comprise grains with a grain size of 0.5 mm or less (Test No. 2-1), while when the upgraded coal having thermal plasticity is used, the ratio of grains of 0.5 mm or less is significantly decreased, and the iron nuggets mainly comprise grains of 0.5 mm or more (Test Nos. 2-2 and 2-3). This is possibly due to the fact that when the coal is upgraded by solvent treatment, the thermal plasticity are improved, and the use of such upgraded coal as a carbonaceous material to be incorporated improves the agglomeration property of melted iron and increases the grain size of the iron nuggets. When coal 1 (high-volatile coal) was used (Test No. 2-1), the yield of the upgraded coal from the original coal was 96%, while when coal 2 (bituminous coal) was used (Test No. 2-3), the yield was 97%. In all tests, the rates of metallization of iron nuggets were about 100%.

solvent treatment of bituminous coal (coal 2), and (3) an extracted coal (Test No. 1 in EXAMPLE 1) produced by solvent treatment of high-volatile coal (coal 1). When the carbonaceous material (2) was used, the carbonaceous material was mixed only with the ilmenite to prepare a mixed raw material. In addition, calcium oxide was further added to a mixed raw material so that the ratio $CaO/SiO_2$ of a slag composition was 0.4, and a FeO reagent was further added to a mixed raw material so that the total Fe content in the mixed raw material was 40% by mass. These prepared mixed raw materials were used in the reduction test. Tables 8 to 10 show the component compositions and grain sizes of the ilmenite and each carbonaceous material used in this embodiment. The ilmenite iron ore was mixed with each carbonaceous material to prepare the mixed raw material, and 5 g of the mixed raw material was charged in a cylinder of 20 mm in diameter. Then, a load of 20 ton was applied to form a tablet, and the formed tablet was reduced at 1500° C. in a nitrogen atmosphere in a small heating furnace. The compounding ratio of the carbonaceous material in each mixed raw material was adjusted so that the amount of the residual carbon in the metal (iron nuggets) was 2% by mass.

A melt produced by the reduction test was cooled to obtain a solid, and the resultant solid was disintegrated and then separated into iron nuggets (metal) and a slag by magnetic separation. Table 7 shows the ratio of the iron nuggets with a grain size of 0.5 mm or more recovered after separation, and the component composition of the slag.

When coal 2 (bituminous coal) initially having a certain degree of thermal plasticity but not treated with the solvent is

TABLE 6

| Test No. | Type of carbonaceous material | Gieseler maximum thermal plasticity of carbonaceous material log(MFD) | Ratio of grains of +0.5 mm in iron nuggets (% by mass) | Evaluation | Remarks |
|---|---|---|---|---|---|
| 2-1 | High-volatile coal (unupgraded coal) | 0 | 3 | Bad | Comparative example |
| 2-2 | Upgraded coal of high-volatile coal (no separation operation) | 0.5 | 70 | Good | Example of this invention |
| 2-3 | Upgraded coal of bituminous coal (no separation operation) | 4 | 98 | Excellent | Example of this invention |

Example 7

A reduction test simulating production of a slag (titanium oxide slag) containing an oxidized nonferrous metal by the carbon composite method was carried out. As a metal oxide, ilmenite was used, and the following three types of carbonaceous materials were used: (1) bituminous coal (coal 2) not treated with a solvent, (2) an extracted coal produced by used, the obtained iron nuggets mainly comprise grains with a grain size of 0.5 mm or less (Test No. 3-1), while when the upgraded coal having significantly improved thermal plasticity is used, the ratio of grains of 0.5 mm or less is significantly decreased, and the iron nuggets mainly comprise grains of 0.5 mm or more (Test Nos. 3-2 to 3-5). In particular, when the basicity of the slag is controlled by adding calcium oxide (Test No. 3-4), the $TiO_2$ purity in the slag is slightly decreased, but not only the metal but also the slag is melted during reduction to facilitate agglomeration of the metal, thereby significantly increasing the ratio of the grains of 0.5 mm or more in the iron nuggets. When the iron content in the mixed raw material is increased by adding the FeO reagent (Test No. 3-5), the slag is little melted during reduction, and thus the agglomeration effect of the metal is lower than that with the raw material (Test No. 3-4) having the controlled basicity. However, agglomeration of the metal is accelerated by increasing the amount of the metal (melted iron), and thus the ratio of the grains of 0.5 mm or more in the iron nuggets is slightly increased. In this case, the $TiO_2$ purity in the slag is not decreased.

When the extracted coal having no ash is used as the upgraded coal (Test No. 3-2 to 3-5), the ratio ($TiO_2$ purity) of the $TiO_2$ component in the slag is increased, as compared with the use of the high-volatile coal having ash (Test No. 3-1).

When the upgraded coal (extracted coal) obtained from high-volatile coal is used (Test No. 3-3), the volatile content of the extracted coal is increased, and the amount of fixed carbon contributing to reduction and carburization is small. Therefore, the amount of the necessary carbonaceous material is larger than that in use of the upgraded coal (extracted coal) of bituminous coal (Test No. 3-2, 3-4, and 3-5).

When the high-volatile coal was used (Test No. 3-2), the yield of the upgraded coal (extracted coal) from the original coal was 62%, while when bituminous coal was used (Test Nos. 3-3 to 3-5), the yield was 42%. In all tests, the rates of metallization of iron nuggets were about 100%.

TABLE 7

| | Test No. | | | | |
|---|---|---|---|---|---|
| | 3-1 | 3-2 | 3-3 | 3-4 | 3-5 |
| Type of carbonaceous material | Bituminous coal (unupgraded) | Upgraded coal of bituminous coal (extracted coal) | Upgraded coal of high-volatile coal (extracted coal) | The same as the left | The same as the left |
| Gieseler maximum thermal plasticity of carbonaceous material log(MFD) | 3 | >4.8 | >4.8 | >4.8 | >4.8 |
| Other additive | No | No | No | Calcium oxide | FeO |
| Ratio of grains of +0.5 mm in iron nuggets (% by mass) | 50 | 90 | 82 | 99 | 92 |
| Slag component % by mass $TiO_2$ | 79.2 | 79.2 | 82.2 | 80.6 | 82.4 |
| FeO | 0.8 | 0.8 | 0.8 | 0.8 | 0.8 |
| $SiO_2$ | 8.4 | 8.4 | 6.0 | 5.9 | 5.9 |
| $Al_2O_3$ | 2.3 | 2.3 | 1.3 | 1.3 | 1.3 |
| CaO | 0.5 | 0.5 | 0.5 | 2.4 | 0.5 |
| MgO | 8.3 | 8.3 | 8.7 | 8.5 | 8.7 |
| Evaluation | Bad | Excellent | Good | Excellent | Excellent |
| Remarks | Comparative Example | Example of this invention | Example of this invention | Example of this invention | Example of this invention |

TABLE 8

| | | Type of carbonaceous material | | | |
|---|---|---|---|---|---|
| | | Coal 1 (high-volatile coal) | Coal treated with solvent (no separation) | Extracted coal | Residual coal |
| Volatile matter content | | 41.5 | 36.4 | 60.4 | 18.0 |
| Fixed carbon content | | 46.9 | 51.3 | 39.55 | 60.3 |
| Ash content | | 11.6 | 12.3 | 0.05 | 21.7 |
| Ash compo- | $SiO_2$ | 62.4 | — | — | 62.4 |
| | $Al_2O_3$ | 25.7 | — | — | 25.7 |
| sition % by mass | CaO | 0.2 | — | — | 0.2 |
| | MgO | 0.2 | — | — | 0.2 |
| | $Fe_2O_3$ | 8.7 | — | — | 8.7 |
| | $TiO_2$ | 2.0 | — | — | 2.0 |

TABLE 9

| | | Type of carbonaceous material | | | |
|---|---|---|---|---|---|
| | | Coal 1 (bituminous coal) | Coal treated with solvent (no separation) | Extracted coal | Residual coal |
| Volatile matter content | | 33.1 | 32.6 | 38.8 | 23.7 |
| Fixed carbon content | | 56.6 | 57.1 | 61.18 | 60.3 |
| Ash content | | 10.3 | 10.3 | 0.02 | 16.0 |
| Ash compo- | $SiO_2$ | 48.4 | — | — | 48.4 |
| | $Al_2O_3$ | 26.1 | — | — | 26.1 |
| sition % by mass | CaO | 0.9 | — | — | 0.9 |
| | MgO | 0.1 | — | — | 0.1 |
| | $Fe_2O_3$ | 7.6 | — | — | 7.6 |
| | $TiO_2$ | 2.0 | — | — | 2.0 |

TABLE 10

| | | Type of raw material | | | |
|---|---|---|---|---|---|
| | | Iron ore | Titanium ore | Calcium oxide | FeO reagent |
| Grain size | | <75 μm, 80% | <75 μm, 80% | — | — |
| Composition % by mass | T·Fe | 68.0 | 34.8 | 0.3 | 76.0 |
| | FeO | 0.1 | 32.3 | — | 99 |
| | $Fe_2O_3$ | 97.1 | 13.9 | 0.4 | — |
| | $SiO_2$ | 1.1 | 3.3 | 6.8 | 0.8 |
| | $Al_2O_3$ | 0.5 | 0.7 | 2.1 | 0.2 |

TABLE 10-continued

|  | Type of raw material | | | |
| --- | --- | --- | --- | --- |
|  | Iron ore | Titanium ore | Calcium oxide | FeO reagent |
| CaO | 0.4 | 0.3 | 88.9 | — |
| MgO | 0.1 | 4.7 | 1.4 | — |
| $TiO_2$ | 0.0 | 44.5 | 0.0 | — |

INDUSTRIAL APPLICABILITY

As described in detail above, the present invention can provide a method for upgrading low rank-coal such as high-volatile coal, which is unsuitable for a conventional carbon composite method, to produce upgraded coal for metallurgy suitable for the carbon composite method. Also, the present invention can provide a method for producing a high-quality reduced metal and slag containing an oxidized nonferrous metal using such upgraded coal for metallurgy.

The invention claimed is:

1. A method for producing a reduced metal using upgraded coal for metallurgy produced by extracting coal with an organic solvent, the method comprising:
    mixing the coal to be extracted with the organic solvent to obtain a raw material slurry;
    aging the raw material slurry with heating to extract a soluble component of the coal in the organic solvent at 0.5 MPa to 1.5 MPa in a nitrogen atmosphere to produce an extracted slurry;
    removing the organic solvent from the extracted slurry by evaporation to obtain the upgraded coal for metallurgy as a solid form;
    wherein removal of the solvent comprises:
    sedimentation of an insoluble component of the coal by allowing the extracted slurry to stand and separate to a supernatant containing an extracted coal, which is the extracted soluble component, and a residual coal slurry containing a residual coal, which is the sedimented insoluble component followed by evaporation of the organic solvent from the supernatant;
    compounding the extracted coal and residual coal to obtain the upgraded coal for metallurgy having a higher thermal plasticity than that of the coal to be extracted;
    mixing the upgraded coal for metallurgy and a metal oxide raw material containing a metal oxide to prepare a mixture; and
    reducing the mixture by heating to produce a reduced metal as a reduced metal mixture.

2. The method according to claim 1, further comprising: successively heating the reduced metal mixture to coagulate the reduced metal in the reduced metal mixture.

3. The method according to claim 1, further comprising: melting the reduced metal mixture by heating in a melting furnace to separate between a metal and a slag; and discharging the metal to the outside of the furnace and recovering the metal as the reduced metal.

4. The method according to claim 1, further comprising: reducing the mixture by heating to produce a reduced metal mixture, and then melting the reduced metal mixture by further heating to produce the reduced metal.

5. The method according to claim 1, further comprising: reducing the mixture by heating in a furnace to produce a reduced mixture, and then melting the reduced mixture by further heating to produce the reduced metal; solidifying the reduced metal by cooling in the furnace to produce a reduced solid; and discharging the reduced solid to the outside of the furnace to separate between a metal and a slag and recover the metal as the reduced metal.

6. The method according to claim 1, further comprising: agglomerating the mixture to obtain grains comprising the upgraded coal and metal oxide raw material wherein a compactness of the grains is increased by fluidization of carbonaceous material of the upgraded coal.

7. The method according to claim 6, further comprising: adding a fluxing agent to the agglomerated granular mixture.

8. The method according to claim 6, wherein the agglomerated granular mixture is dried prior to the reduction.

9. The method according to claim 6, wherein the agglomerated grains are obtained by compression molding in a compression molding machine selected from the group consisting of a briquette press, a tumbling agglomerator, a disk pelletizer and an extrusion molding machine.

10. A method for producing a slag containing an oxidized nonferrous metal using upgraded coal for metallurgy, which is produced by extracting coal with an organic solvent, the method comprising:
    mixing the coal to be extracted with the organic solvent to obtain a raw material slurry;
    aging the raw material slurry with heating to extract a soluble component of the coal in the organic solvent at 0.5 MPa to 1.5 MPa in a nitrogen atmosphere to produce an extracted slurry;
    removing the organic solvent from the extracted slurry by evaporation to obtain the upgraded coal for metallurgy as a solid form;
    wherein removal of the solvent comprises:
    sedimentation of an insoluble component of the coal by allowing the extracted slurry to stand and separate to a supernatant containing an extracted coal, which is the extracted soluble component, and a residual coal slurry containing a residual coal, which is the sedimented insoluble component followed by evaporation of the organic solvent from the supernatant to obtain the upgraded coal for metallurgy having a higher thermal plasticity than that of the coal to be extracted;
    mixing the upgraded coal for metallurgy and a metal oxide-containing raw material containing iron oxide and an oxidized nonferrous metal to prepare a mixture;
    reducing the iron oxide in the mixture by heating the mixture in a furnace to produce a reduced mixture containing metallic iron, and then melting the metallic iron by heating the reduced mixture to separate between the metallic iron and an oxidized nonferrous metal slag;
    solidifying the metallic iron in the mixture containing the oxidized nonferrous metal slag and the melted metallic iron by cooling in the furnace to produce a reduced solid; and
    discharging the reduced solid to the outside of the furnace to separate between the metal and the slag and recover the slag as the oxidized nonferrous metal slag.

11. The method according to claim 10, further comprising: agglomerating the mixture to obtain grains comprising the upgraded coal and metal oxide raw material wherein a compactness of the grains is increased by fluidization of carbonaceous material of the upgraded coal.

12. The method according to claim 11, further comprising: adding a fluxing agent to the agglomerated granular mixture.

13. The method according to claim 11, wherein the agglomerated granular mixture is dried prior to the reduction.

14. The method according to claim 11, wherein the agglomerated grains are obtained by compression molding in a compression molding machine selected from the group consisting of a briquette press, a tumbling agglomerator, a disk pelletizer and an extrusion molding machine.

\* \* \* \* \*